(12) United States Patent
Sakata et al.

(10) Patent No.: US 10,402,732 B2
(45) Date of Patent: Sep. 3, 2019

(54) USER MANAGEMENT METHOD, SERVER DEVICE, AND USER MANAGEMENT SYSTEM

(71) Applicant: Panasonic Intellectual Property Corporation of America, Torrance, CA (US)

(72) Inventors: Kotaro Sakata, Tokyo (JP); Tomoaki Maruyama, Osaka (JP); Kenji Kondo, Osaka (JP); Hiroaki Yamamoto, Osaka (JP); Masayoshi Tojima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 743 days.

(21) Appl. No.: 14/406,674

(22) PCT Filed: Oct. 8, 2013

(86) PCT No.: PCT/JP2013/005988
§ 371 (c)(1),
(2) Date: Dec. 9, 2014

(87) PCT Pub. No.: WO2014/068855
PCT Pub. Date: May 8, 2014

(65) Prior Publication Data
US 2015/0161514 A1    Jun. 11, 2015

Related U.S. Application Data

(60) Provisional application No. 61/720,580, filed on Oct. 31, 2012.

(51) Int. Cl.
*G06N 5/04*    (2006.01)
*G06Q 10/10*    (2012.01)

(52) U.S. Cl.
CPC .............. *G06N 5/04* (2013.01); *G06Q 10/10* (2013.01)

(58) Field of Classification Search
CPC ................. G06Q 10/20; G06N 5/04
See application file for complete search history.

(56) References Cited

U.S. PATENT DOCUMENTS

2002/0087350 A1*  7/2002  Miida ............... G06Q 10/20
                                                                 705/305
2004/0138945 A1*  7/2004  Adkins .............. G03G 21/02
                                                                 705/14.23

(Continued)

FOREIGN PATENT DOCUMENTS

CN         101102206         1/2008
JP         2002-183328       6/2002

(Continued)

OTHER PUBLICATIONS

International Search Report dated Jan. 7, 2014 in corresponding International Application No. PCT/JP2013/005988.

(Continued)

*Primary Examiner* — Kakali Chaki
*Assistant Examiner* — Michael Zidanic
(74) *Attorney, Agent, or Firm* — Wenderoth, Lind & Ponack, L.L.P.

(57) ABSTRACT

A user management method according to the present disclosure includes: storing appliance use information including: appliance identification information for identifying an appliance; user information for identifying a user of the appliance; and an operating state of the appliance when the appliance was used; analyzing the appliance use information stored in the storing to identify, from among a plurality of functions of the appliance, one or more first functions each having a use frequency less than or equal to a threshold value; and providing the user with a notice which prompts (Continued)

use of the one or more first functions identified in the analyzing.

12 Claims, 8 Drawing Sheets

(56) References Cited

U.S. PATENT DOCUMENTS

| | | | |
|---|---|---|---|
| 2005/0251412 A1 | 11/2005 | Miida et al. | |
| 2007/0035757 A1 | 2/2007 | Aikawa | |
| 2011/0125700 A1 | 5/2011 | Funada | |
| 2011/0153101 A1* | 6/2011 | Thomas | G06Q 10/04 700/291 |
| 2011/0302300 A1* | 12/2011 | Kikkawa | H04L 12/2809 709/224 |

FOREIGN PATENT DOCUMENTS

| | | |
|---|---|---|
| JP | 2002-358377 | 12/2002 |
| JP | 2003-345487 | 12/2003 |
| JP | 2007-48035 | 2/2007 |
| JP | 2010-257165 | 11/2010 |
| JP | 2011-197882 | 10/2011 |
| WO | 2010/010653 | 1/2010 |

OTHER PUBLICATIONS

Office Action dated Apr. 18, 2017 in corresponding Chinese Application No. 201380030324.3 (with English translation of Search Report).

* cited by examiner

| User ID | Operating state | Transmittance flag |
|---------|-----------------|--------------------|
| E04 | Cooking menu No. 28 | Transmitted |
| XXX | Auto heat | Transmitted |
| E01 | Cooking menu No. 31 | Transmitted |
| ... | ... | ... |
| E04 | Cooking menu No. 2 | Not transmitted |

| User ID | Appliance ID | Operating state |
|---|---|---|
| 398301E04 | O63214A | Cooking menu No. 28 |
| 231012E01 | W92910B | Clean washing tank |
| 231012E01 | W92910B | Auto washing and drying mode |
| ... | ... | ... |
| 231012E01 | O63214A | Cooking menu No. 31 |

ABC company

XY branch

Mr./Ms. Master of ABC company
Thank you for being a customer of ABC company products.

Since you are a Master, your warranty period will be specially extended.

Receipt

No. 25439437972
20160214 14:34

Cashier: XYZ

Refrigerator 6 doors ￥154,800
Master warranty    For 12 years

USER MANAGEMENT METHOD, SERVER DEVICE, AND USER MANAGEMENT SYSTEM

TECHNICAL FIELD

The present invention relates to user management methods, server devices, and user management systems.

BACKGROUND ART

There is a technique for generating a model for predicting a transition of a user's usage for a terminal device from an operation record (see Patent Literature 1).

CITATION LIST

Patent Literature

[PTL 1] International Publication No. WO2010-010653

SUMMARY OF INVENTION

Technical Problem

The technique disclosed in PTL 1, however, cannot provide information which facilitates a user to make full use of an appliance including a plurality of functions.

The present invention has been conceived in view of the above problem. An object of the present invention is to provide a user management method, a server device, and a user management system which are capable of providing information which facilitates a user to make full use of an appliance including a plurality of functions.

Solution to Problem

In order to achieve the above object, a user management method according to one aspect of the present invention includes: storing appliance use information including: appliance identification information for identifying an appliance; user information for identifying a user of the appliance; and an operating state of the appliance when the appliance was used; analyzing the appliance use information stored in the storing to identify one or more first functions from among a plurality of functions of the appliance, the one or more first functions each having a use frequency less than or equal to a threshold value; and providing the user with a notice which prompts use of the one or more first functions identified in the analyzing.

These general and specific aspects may be implemented using a system, a method, an integrated circuit, a computer program, a recording medium such as a computer readable compact disc read only memory (CD-ROM), or any combination of systems, methods, integrated circuits, computer programs, and recording mediums.

Advantageous Effects of Invention

The user management method and the like according to one aspect of the present invention are capable of providing information which facilitates a user to make full use of an appliance including a plurality of functions.

DESCRIPTION OF EMBODIMENT (Underlying Knowledge Forming Basis of the Present Invention)

In relation to the technique disclosed in PTL 1 described in the Background Art section, the inventors have found the following problem:

In PTL 1, a usage cluster generating unit generates a plurality of user groups consisting of users whose characteristic values representing usage characteristic calculated from operation record information are similar. Specifically, the usage cluster generating unit generates the user groups based on the operation record information about a plurality of first users of a terminal device. A usage transition model generating unit generates a usage transition model representing a transition relationship between the user groups. Specifically, the usage transition model generating unit analyzes for each operation record information item of each divided section that the characteristic value is classified in which of the usage characteristics of the user groups. The divided section is obtained by dividing the operation record information about a plurality of second users of the terminal device. The usage transition model generating unit then generates a usage transition model based on a result of the analysis.

Appliances such as a television and a washing machine often include many functions including, for example, a function for performing maintenance (care) of the appliance. Some of the functions are not used by a user because the user does not know about the functions.

The conventional structure disclosed in PTL 1, however, cannot determine how well the user uses the appliance. Accordingly, information cannot be provided which facilitates the user to make full use of the appliance including a plurality of functions.

One aspect of the present invention has been conceived in order to overcome the above problem. An object of the present invention is to provide a user management method, a server device, and a user management system which are capable of providing information which facilitates a user to make full use of an appliance including a plurality of functions.

In order to achieve the above object, a user management method according to one aspect of the present invention includes: storing appliance use information including: appliance identification information for identifying an appliance; user information for identifying a user of the appliance; and an operating state of the appliance when the appliance was used; analyzing the appliance use information stored in the storing to identify one or more first functions from among a plurality of functions of the appliance, the one or more first functions each having a use frequency less than or equal to a threshold value; and providing the user with a notice which prompts use of the one or more first functions identified in the analyzing.

With this, a user management method can be obtained which is capable of providing information which facilitates a user to make full use of an appliance including a plurality of functions.

Specifically, according to the user management method in the aspect, one or more first functions are identified as information which facilitates full use of the appliance, and a notice which prompts use of the identified first functions is provided to the user. In this way, information which facilitates full use of the appliance can be provided.

Here, for example, it may be that in the analyzing, one or more second functions are identified from among the plurality of functions of the appliance based on the appliance use information, and a use frequency of each of the one or more second functions identified is calculated based on the appliance use information, the one or more second functions each achieving the operating state of the appliance indicated by the appliance use information, and the one or more first functions identified include (i) a function having a use frequency less than or equal to a threshold value among the one or more second functions of the appliance used by the user, and (ii) a function not used by the user among the plurality of functions excluding the one or more second functions.

Accordingly, functions not used well by the user can be identified, so that a notice which prompts use of the first functions of the appliance can be provided to the user.

Here, for example, it may be that the threshold value is zero, and the one or more first functions have never been used by the user among the plurality of functions of the appliance.

Accordingly, the first functions not used by the user can be identified, so that a notice which prompts use of the first functions of the appliance can be provided to the user.

Moreover, for example, it may be that in the providing, a notice is provided to the user, the notice prompting use of a first function for performing maintenance of the appliance among the one or more first functions identified.

Accordingly, first functions for performing maintenance of the appliance can be identified from among the first functions of the appliance not used by the user, so that a notice which prompts use of the first functions for performing maintenance of the appliance can be provided to the user.

Moreover, for example, the user management method may further include adding one or more points for ranking the user information, and it may be that in the adding, one or more points are added to the user information of the user of the appliance, a total number of the one or more points increasing with a decrease in a total number of the one or more first functions among the plurality of functions of the appliance.

This can give the user incentive to make full use of the appliance.

Here, for example, the user management method may further include extending a warranty period of the appliance of the user indicated by the user information to which the total number of the one or more points greater than or equal to a predetermined point has been added.

This can give the user incentive to make full use of the appliance.

Moreover, for example, the user management method may further include permitting the user indicated by the user information, to which the total number of the one or more points greater than or equal to a predetermined point has been added, to perform an act in a predetermined community.

This can give the user incentive to make full use of the appliance.

Moreover, for example, it may be that the appliance comprises a plurality of appliances, and in the analyzing, the appliance use information stored in the storing is further analyzed and two or more appliances used during a same time period are identified from among the plurality of appliances to calculate a level of housework efficiency increased by the user of the plurality of appliances.

With this, information can be provided which facilitates the user to make full use of the appliance to increase housework efficiency.

Moreover, for example, the user management method may further include communicating with each of a plurality of the appliances to receive the appliance use information of the appliance, and it may be that the appliance identification information is for identifying a type of the appliance, and in the analyzing, the appliance use information of the appliance is analyzed to identify a function from among a plurality of functions of each type of the plurality of appliances as the one or more first functions, the function having a use frequency less than or equal to a threshold value determined for each type of the plurality of appliances.

With this, information can be provided which facilitates the user to make full use of appliances each including a plurality of functions.

Moreover, for example, the user management method may further include: adding one or more points for ranking the user information, and in the adding, among user information items of users each of whom is a user of two or more types of the appliances, one or more points are added to a user information item of a user of the two or more types of the appliances, a total number of the one or more points increasing with a decrease in a total number of the one or more first functions identified from among a plurality of functions of each of the two or more types of the appliances.

This can give the user incentive to make full use of the appliances.

Moreover, in order to achieve the above object, a server device according to an aspect of the present invention includes: an appliance information storage unit configured to store appliance use information including: appliance identification information for identifying an appliance; user information for identifying a user of the appliance; and an operating state of the appliance when the appliance was used; a use analyzing unit configured to analyze the appliance use information stored in the appliance information storage unit to identify one or more first functions from among a plurality of functions of the appliance, the one or more first functions each having a use frequency less than or equal to a threshold value; and a notice providing unit configured to provide the user with a notice which prompts use of the one or more first functions identified by the use analyzing unit.

Moreover, in order to achieve the above object, a user management system according to an aspect of the present invention includes: a plurality of appliances; and a server device. The server device includes: an appliance information storage unit configured to store appliance use information including: appliance identification information for identifying each of the plurality of appliances; user information for identifying a user of the appliance; and an operating state of the appliance when the appliance was used; a use analyzing unit configured to analyze the appliance use information stored in the appliance information storage unit to identify one or more first functions from among a plurality of functions of the appliance, the one or more first functions each having a use frequency less than or equal to a threshold value; and a notice providing unit configured to provide the user with a notice which prompts use of the one or more first functions identified by the use analyzing unit.

The embodiment described below shows a specific example of the present invention. The numerical values, shapes, materials, structural elements, the arrangement and connection of the structural elements, steps, the processing order of the steps etc. shown in the embodiment are mere examples, and therefore do not limit the scope of the present invention. Therefore, among the structural elements in the following embodiment, structural elements not recited in any one of the independent claims defining the most generic part are described as arbitrary structural elements.

Hereinafter, an embodiment of the present invention will be described in greater detail with reference to the accompanying Drawings.

EMBODIMENT

Figure 1:
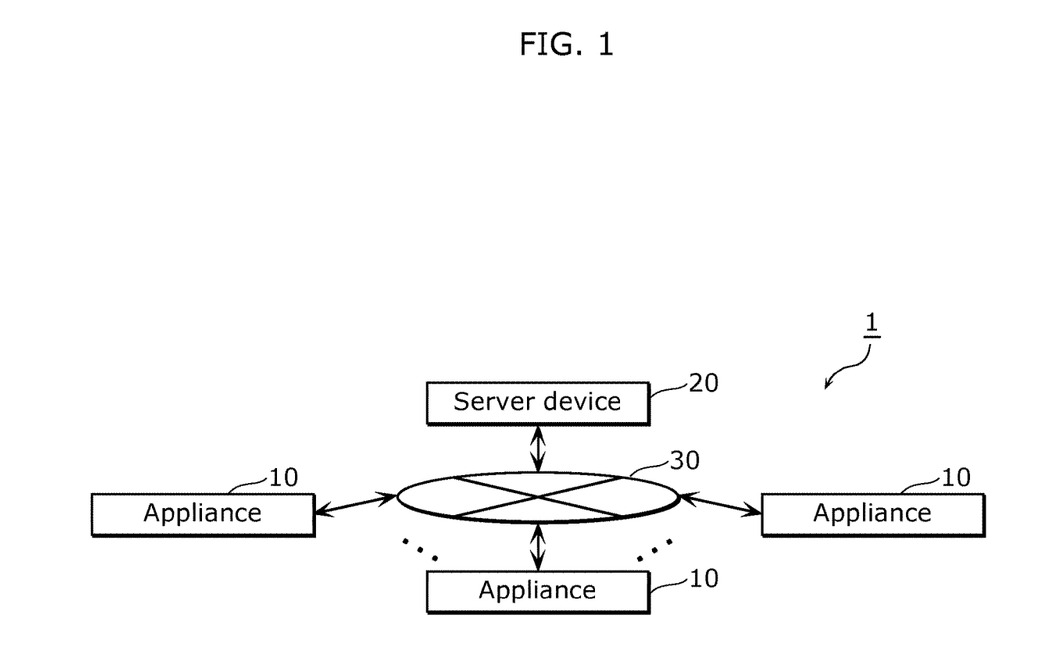
FIG. 1 is a configuration diagram of a user management system according to an embodiment.

FIG. 1 is a configuration diagram of a user management system according to an embodiment.

A user management system 1 illustrated in FIG. 1 includes appliances 10 and a server device 20 which are interconnected via a network 30.

[Appliance]

Figure 2:
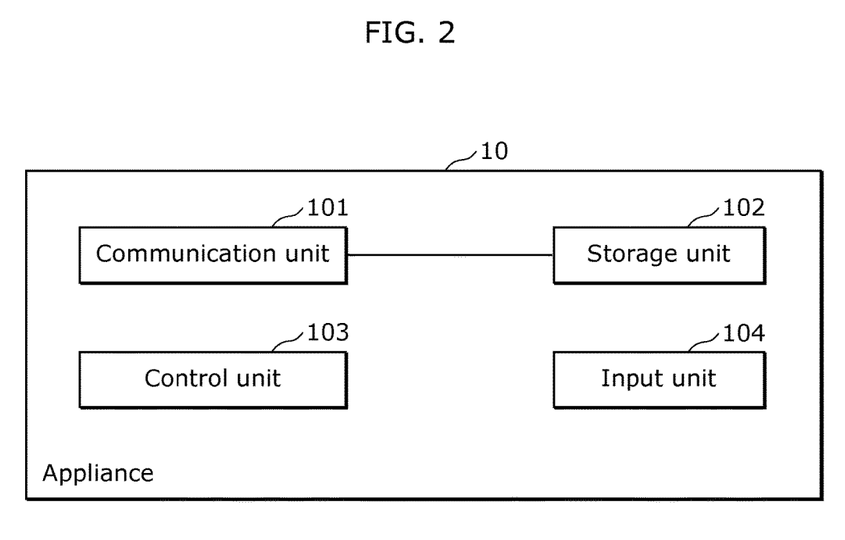
FIG. 2 is a block diagram illustrating one example of a configuration of an appliance according to the embodiment.
Figure 3:
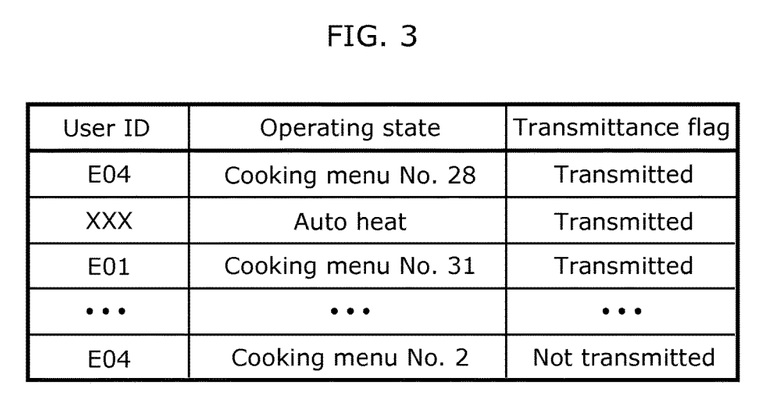
FIG. 3 illustrates one example of a structure of data held by the appliance according to the embodiment.

FIG. 2 is a block diagram illustrating an example of a configuration of each of the appliances according to the present embodiment. FIG. 3 illustrates an example of a structure of data held by each appliance according to the present embodiment.

Each of the appliances 10 includes a plurality of functions which are executed by a user instruction or operation. As FIG. 2 illustrates, the appliance 10 includes a communication unit 101, a storage unit 102, a control unit 103, and an input unit 104. Examples of the appliance 10 include home electrical appliances such as television, air conditioner, refrigerator, washing machine, vacuum cleaner, air cleaner, electric toothbrush, and dryer. Other examples of the appliance 10 include: an information terminal such as personal computer, mobile phone, smartphone, and tablet; a sensor appliance such as blood sugar sensor device; and an appliance or a system including a plurality of functions, such as toilet, bathroom, mirror, and lighting. In other words, the appliance 10 may be any one of the above types.

The storage unit 102 stores data such as programs, user related data, and control data for controlling the appliance 10.

In the present embodiment, the storage unit 102 stores, for example, appliance identification information for identifying the appliance 10, user information for identifying the user of the appliance 10, and the operating state of the appliance 10 when the appliance 10 is used by the user. The storage unit 102 also stores whether or not such information has already been transmitted to the server device 20. The storage unit 102 may store information in the data structure as illustrated in FIG. 3, for example. Specifically, the storage unit 102 may store, a data structure (table) which associates a user ID as user information, an operating state, and a transmittance flag indicating whether or not such information has already been transmitted.

The user information is information for identifying the user of the appliance 10, and includes an identifier unique to each user (hereinafter, referred to as a user ID). The user ID may be assigned to each of users, or to a user group who uses the appliance 10. For example, the user ID may be assigned to a user as a unit of family or an individual user. The user information is stored into the storage unit 102 by an offline or online operation at an appropriate timing such as at the time of purchase of the appliance 10.

The appliance identification information may be an identifier for uniquely identifying the appliance 10 or information for identifying the type of the appliance 10. In the present embodiment, the appliance identification information is, for example, a unique identifier (hereinafter, referred to as an appliance ID), and is preassigned to each appliance 10. For example, the appliance ID is stored into the storage unit 102 of the appliance 10 at the time of manufacture of the appliance 10. The appliance ID may be stored into the storage unit 102 not only at the time of manufacture of the appliance 10, but also at an appropriate timing by an offline or online operation.

The communication unit 101 is connected to the network 30, and is connected to the server device 20 via the network 30. The communication unit 101 transmits and receives data to and from the server device 20. Examples of the data include a program, user related data, and control data for controlling the appliance 10.

In the present embodiment, the communication unit 101 transmits appliance identification information, user information, operating states of the appliance 10 and the like to the server device 20.

The input unit 104 receives information for operating the appliance 10. The input unit 104 receives information for operating the appliance 10 by a user instruction or operation.

The control unit 103 controls the appliance 10. Specifically, the control unit 103 executes at least one of functions included in the appliance 10, by a user designation or operation. For example, in the case where the appliance 10 is a microwave, the control unit 103 executes a heating function or an oven function among functions including, for example, the heating function, the oven function, and a recipe executing function, by a user instruction or operation.

The control unit 103 also manages the operating state of the appliance 10. The operating state of the appliance 10 changes, for example, when the input unit 104 receives a new operation or an instruction for executing a new operation. When the operating state of the appliance 10 changes, the control unit 103 stores into the storage unit 102 the user ID in association with the operating state after the change.

The control unit 103 periodically transmits information indicating the operating state of the appliance 10 to the server device 20 via the communication unit 101 at a predetermined timing, for example, about every five minutes while power is supplied to the appliance 10. More specifically, the control unit 103 transmits the user ID, the appliance ID, and the operating state of the appliance 10 to the server device 20 via the communication unit 101. The control unit 103 may transmit appliance use information including the user ID, the appliance ID and the operating state of the appliance 10 to the server device 20 via the communication unit 101. The timing or frequency at which the control unit 103 transmits the user ID, the appliance ID, and the operating state of the appliance 10 to the server device 20 may be other than the predetermined timing.

[Server Device]

Figure 4:
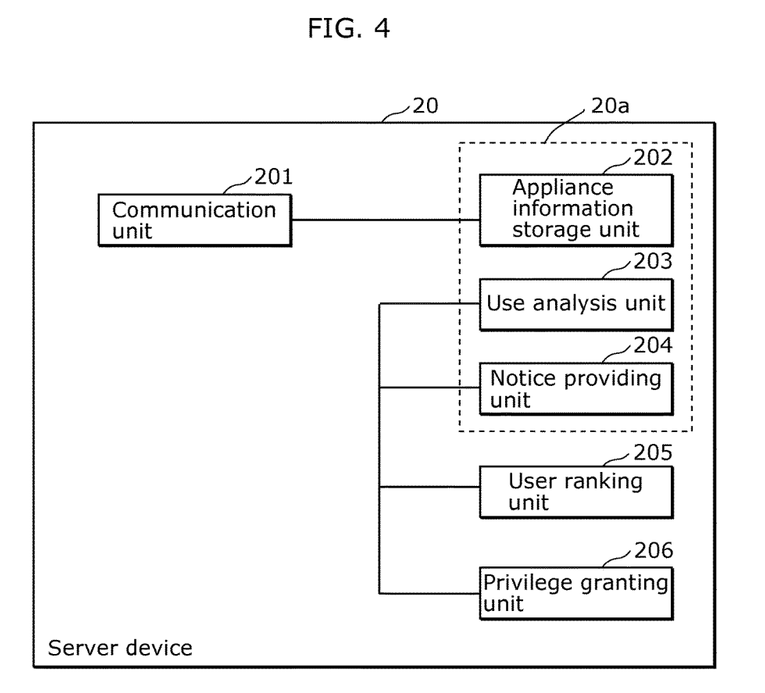
FIG. 4 is a block diagram illustrating one example of a configuration of a server device according to the embodiment.
Figure 5:
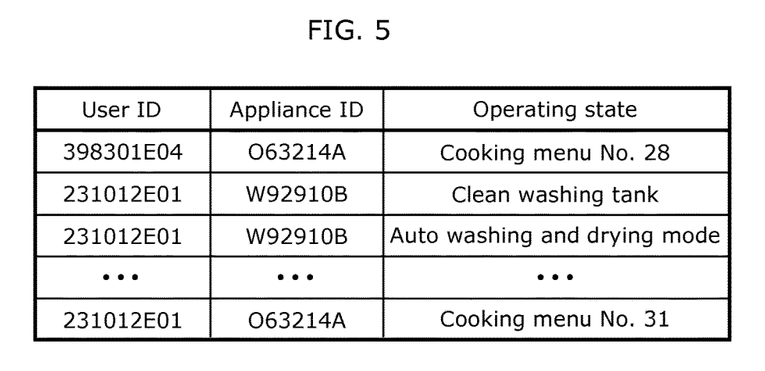
FIG. 5 illustrates one example of a structure of data held by the server device according to the embodiment.

FIG. 4 is a block diagram illustrating one example of a configuration of the server device according to the present embodiment. FIG. 5 illustrates an example of a structure of data held by the server device according to the present embodiment.

The server device 20 provides information which facilitates a user to make full use of the appliance 10 including a plurality of functions. Specifically, as FIG. 4 illustrates, the server device 20 includes a communication unit 201, an appliance information storage unit 202, a use analysis unit 203, a notice providing unit 204, a user ranking unit 205, and a privilege granting unit 206.

The server device 20 is specifically configured from a microprocessor, a ROM, a random access memory (RAM), a hard disk and the like not illustrated. The ROM, RAM, and hard disk store computer programs. The microprocessor operates on a program, which executes a function of the server device 20. In the present embodiment, each functional block of the communication unit 201, the appliance information storage unit 202, the use analysis unit 203, the user ranking unit 205, and the privilege granting unit 206 may be implemented by a software, a combination of a software with a large scale integration (LSI) which is an integrated circuit, or an LSI.

(1) Communication Unit 201

The communication unit 201 receives the operating state of each appliance transmitted from the appliance, and user information associated with the operating state.

In the present embodiment, the communication unit 201 communicates with each of the appliances 10 to receive appliance use information of the appliance 10. As described above, the appliance use information includes the appliance identification information, the user information for identifying the user of the appliance 10, and the operating state of the appliance 10. The communication unit 201 may receive the appliance use information itself from each of the appliances 10, or may receive the appliance identification information, the user information for identifying the user of the appliance 10, and the operating state of the appliance 10 as the appliance use information.

(2) Appliance Information Storage Unit 202

The appliance information storage unit 202 stores the operating state of the appliance 10 and the user information associated with the operating state received by the communication unit 201.

In the present embodiment, the appliance information storage unit 202 stores appliance use information including the appliance identification information for identifying the appliance 10, the user information for identifying the user of the appliance 10, and the operating state of the appliance 10 when the appliance 10 was used.

The appliance information storage unit 202 may store appliance use information in the data structure as illustrated in FIG. 5, for example. Specifically, the appliance information storage unit 202 may store, as the appliance use information, the user ID as the user information, the appliance ID as the appliance identification information, and the operating state of the appliance 10 in association with one another. The appliance use information can also be referred to as use history which is a record of the operating states of the corresponding appliance used by the user.

In the example illustrated in FIG. 5, the initial alphabet of the appliance ID represents the type of the appliance 10. The second number from the beginning of the appliance ID represents the level of importance of information provided by the appliance 10 in nine levels from 1 (low) to 9 (high).

For example, in the case of the appliance 10 having appliance ID O63214A, the initial letter O represents that the appliance is a microwave oven. The second number from the beginning of the appliance ID is 6 which represents that the importance level of information provided by the microwave oven is 6.

Even if the type of the appliance is the same, different models include different sensors and the like. Hence, the level of importance of the information provided by each appliance is different. For example, in the case where all the models of an air cleaner include a sensor for detecting house dust, but only high-end models include an odor sensor and middle-end models and low-end models do not include the odor sensor, the level of importance of information provided by the high-end models is higher than the level of importance of information provided by the middle-end models or low-end models. Among the models including the odor sensor, the level of importance of information provided by each model differs depending on the determination accuracy of the type of odor.

Moreover, for example, "auto washing and drying mode", "clean washing tub", and "cooking menu No. xx" each represents the operating state of the appliance.

(3) Use Analysis Unit 203

The use analysis unit 203 analyzes the appliance use information stored in the appliance information storage unit 202, and calculates an index indicating whether or not the user is making full use of the appliance 10 including a plurality of functions (the level of full use of the appliance).

Specifically, the use analysis unit 203 analyzes the appliance use information stored in the appliance information storage unit 202 to identify one or more first functions each having a use frequency less than or equal to a threshold value from among the functions of the appliance 10. Here, the use frequency of a function refers to the number of times or the length of the period the function was used in a predetermined period. The predetermined period may be a certain period of time such as one week or one month, or a period from the first use to the current time.

More specifically, the use analysis unit 203 identifies one or more second functions from among the functions of the appliance 10 based on the appliance use information. Each of the second functions achieves the operating state of the appliance 10 indicated by the appliance use information. The use analysis unit 203 then calculates the use frequency of each of the identified second functions. The use analysis unit 203 identifies, as the first functions, (i) functions each having a use frequency less than or equal to a threshold value among the second functions of the appliance 10 used by the user, and (ii) functions not used by the user among the functions of the appliance 10 excluding the second functions.

For example, each of the first functions may be a function which has never been used by the user of the appliance 10 among the functions of the appliance 10 in a predetermined period (—that is, the threshold value is zero).

The use analysis unit 203 may calculate, as an example of the index indicating the level of full use, the use coverage rate of the appliance 10 obtained by subtracting the number of the first functions from the total number of functions of the appliance 10. In other words, the use analysis unit 203 may calculate at least the use coverage rate of the functions of the appliance 10 for each user from the appliance use information stored in the appliance information storage unit 202. Accordingly, the use analysis unit 203 can quantify the level of full use of the appliance 10, allowing evaluation of function use coverage which indicates how many functions have been used among all of the functions of the appliance 10.

A description has been given of the case where there is one appliance 10 used by one user for ease of description, but the present invention is not limited to the example. It may be that the first functions for each of appliances 10 are identified for each user, and that the use coverage rate and the level of full use are calculated for each user. In such a case, it may be that the threshold value is set to a different value for each type of the appliances 10, and that all of the functions, which serve as the denominator for the use coverage rate and the level of full use, refer to all of the functions of each type of the appliances 10.

Specifically, the use analysis unit 203 may analyze the appliance use information of each appliance 10 to identify, as the first functions, functions each having a use frequency less than or equal to a threshold value predetermined for each type of the appliances 10, from among the functions of each type of the appliances 10. Accordingly, the first functions, the use coverage rate, and the level of full use of the same type (same model) of the appliances 10 can be compared among different users. As a result, it is also possible to identify a user who uses the function not frequently used by other users of the same type of the appliances 10. In order to facilitate a user to make full use of the appliance 10, privilege information, a notice which prompts use of the first functions, and the like may be provided to the user.

The use analysis unit 203 may analyze the appliance use information stored in the appliance information storage unit 202 to analyze, as the level of full use of the appliances 10, for example, the level of housework efficiency increased by concurrently operating a plurality of appliances 10. More specifically, the use analysis unit 203 may further analyze the appliance use information stored in the appliance information storage unit 202 and identify two or more of the appliances 10 used in the same time period, to calculate the level of housework efficiency increased by the user of the appliances 10.

Here, the term "the level of housework efficiency increased" will be described.

Figure 6:
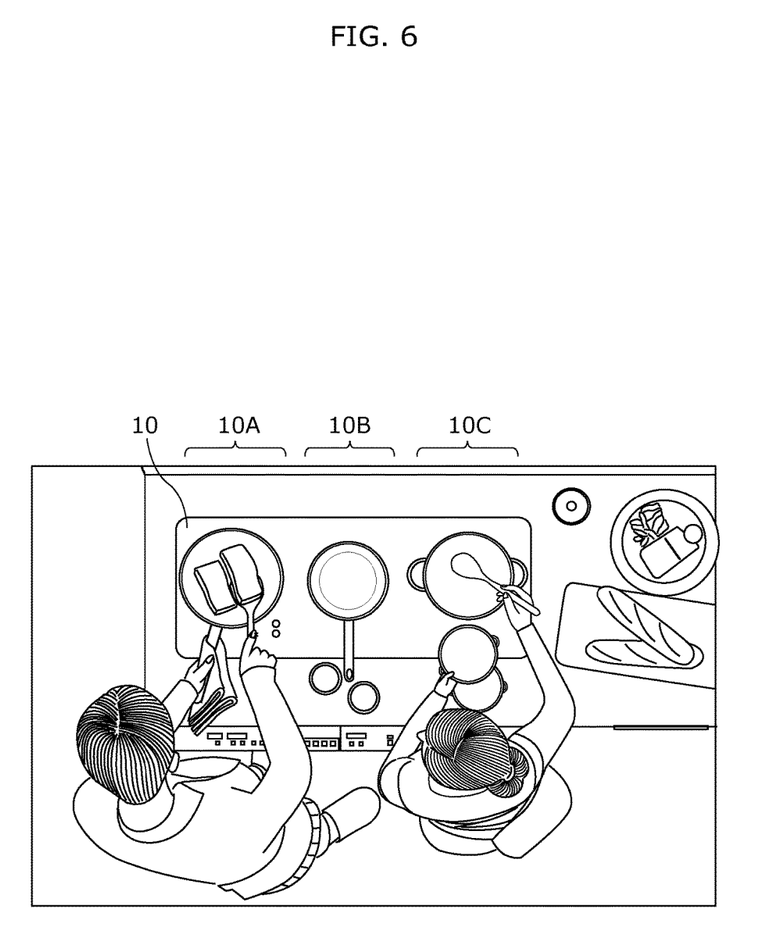
FIG. 6 illustrates one example of a scene where housework efficiency is increased according to the embodiment.

FIG. 6 illustrates one example of a scene where housework efficiency is increased according to the present embodiment.

In the example illustrated in FIG. 6, the appliance 10 is an induction cooktop having three burners. Appliances 10A to 10C respectively correspond to the left, middle, and right burners. FIG. 6 also illustrates a scene of housework (cooking) with use of two burners (the appliances 10A and 10C) of the appliance 10. In the scene illustrated in FIG. 6, the appliance 10B is not being used, but it can be seen that the appliance 10B was used before. The appliance use information at this time has a record of the operating states in which the appliance 10A to the appliance 10C of the appliance 10 are used in the same time period.

In such a case, the use analysis unit 203 may calculate the level of housework efficiency increased, based on the appliance use information by using Expression 1, for example.

$$(d1+d2)/T \qquad \text{(Expression 1)}$$

Here, d1 is a rate of a time period during which the appliance 10A to the appliance 10C are concurrently used, d2 is a rate of a time period during which the appliance 10A and the appliance 10C (two burners out of three burners) are concurrently used, and T is a time period during which the appliance 10 is used, that is, during which any one of the appliance A to the appliance 10C is used.

In the above manner, the use analysis unit 203 analyzes the appliance use information stored in the appliance information storage unit 202, and identifies two or more of the appliances 10 used in the same time period. As a result, the use analysis unit 203 can calculate the level of housework efficiency increased by the user of the appliances 10. Accordingly, the use analysis unit 203 can quantify the level of full use of the appliance 10 as the level of housework efficiency increased by the user. As a result, the use analysis unit 203 can evaluate the "concurrency" of the user indicating whether or not the user is increasing housework efficiency and the like by concurrently operating a plurality of appliances 10 (or a plurality of functions of the appliance 10).

In the above example, if three burners (the appliance 10A to the appliance 10C) of the induction cooktop (the appliance 10) are concurrently used, efficiency of cooking is increased, resulting in an evaluation of high concurrency. Another example of high concurrency is turning up the temperature setting of the air conditioner while cooking hot pot in winter which contributes to energy saving.

(4) Notice Providing Unit 204

The notice providing unit 204 provides the user with a notice which prompts use of the first functions identified by the use analysis unit 203, for example. The notice providing unit 204 may provide the user with a notice which prompts use of first functions for performing maintenance of the appliance 10 among the identified first functions. Here, the notice which prompts use of the first functions is an example of information for facilitating the user to make full use of the appliance 10.

The notice providing unit 204 may provide the above notice to the appliance 10 of the user via the communication unit 201, or may provide the above notice via a mobile terminal such as a smartphone of the user or a television watched by the user.

(5) User Ranking Unit 205

The user ranking unit 205 calculates, for each user, the use level of the appliance 10 or a group of the appliances 10 based on the result of the analysis obtained by the use analysis unit 203.

Specifically, the user ranking unit 205 may calculate the use coverage rate of the same type of appliance 10 for each user as the use level of the appliance 10. The user ranking unit 205 may calculate the use coverage rate of a group of appliances 10 for each user as the use level of the group of the appliances 10. Here, the use coverage rate of the group of the appliances 10 is obtained by subtracting a total number of the first functions of each appliance 10 from all the functions of the plurality of appliances 10 of the user.

The user ranking unit 205 adds points to rank user information. For example, the user ranking unit 205 adds points to the user information of the user of the appliance 10. The number of points increases with a decrease in the number of first functions among all of the functions of the appliance 10.

Among user information items of users each of whom is a user of two or more types of the appliances 10, the user ranking unit 205 may add points to a user information item of a user of the two or more types of the appliances 10. The number of points increases with a decrease in a total number of the first functions identified from among a plurality of functions of each of the two or more types of the appliances 10.

In this way, the user ranking unit 205 can rank a user having a higher use coverage rate higher than a user having a lower use coverage rate. This can give the user the pleasure of making full use of the appliances 10 or incentive to make full use of the appliances 10, motivating the user to make full use of the appliances 10.

(6) Privilege Granting Unit 206

The privilege granting unit 206 gives the user incentive to make full use of the appliance 10 by providing a service such as granting privilege according to the level of full use of the appliance 10.

Figure 7A:
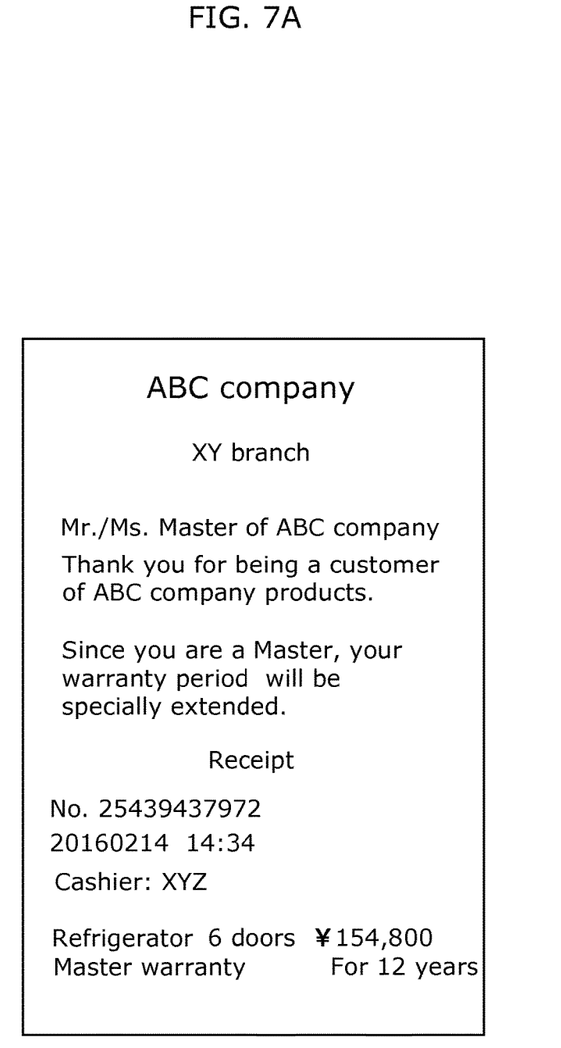
FIG. 7A illustrates one example of privilege information according to the embodiment.
Figure 7B:
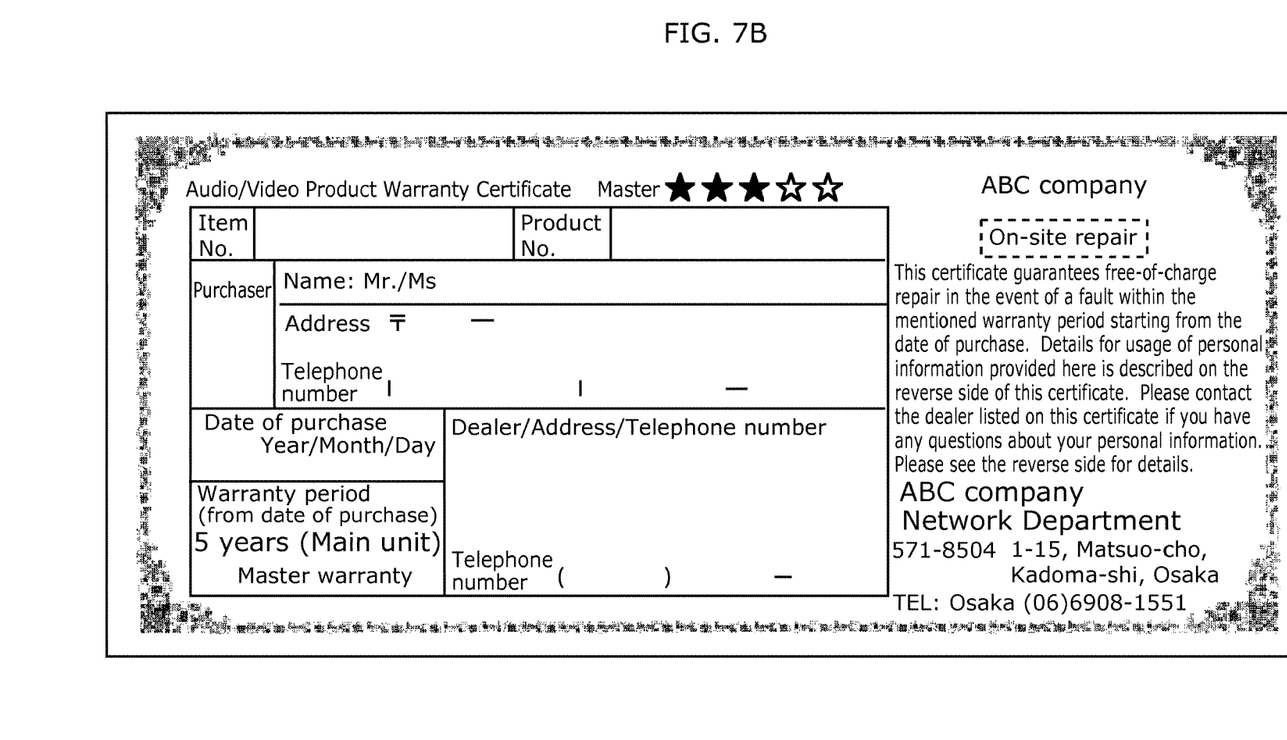
FIG. 7B illustrates another example of the privilege information according to the embodiment.
Figure 8:
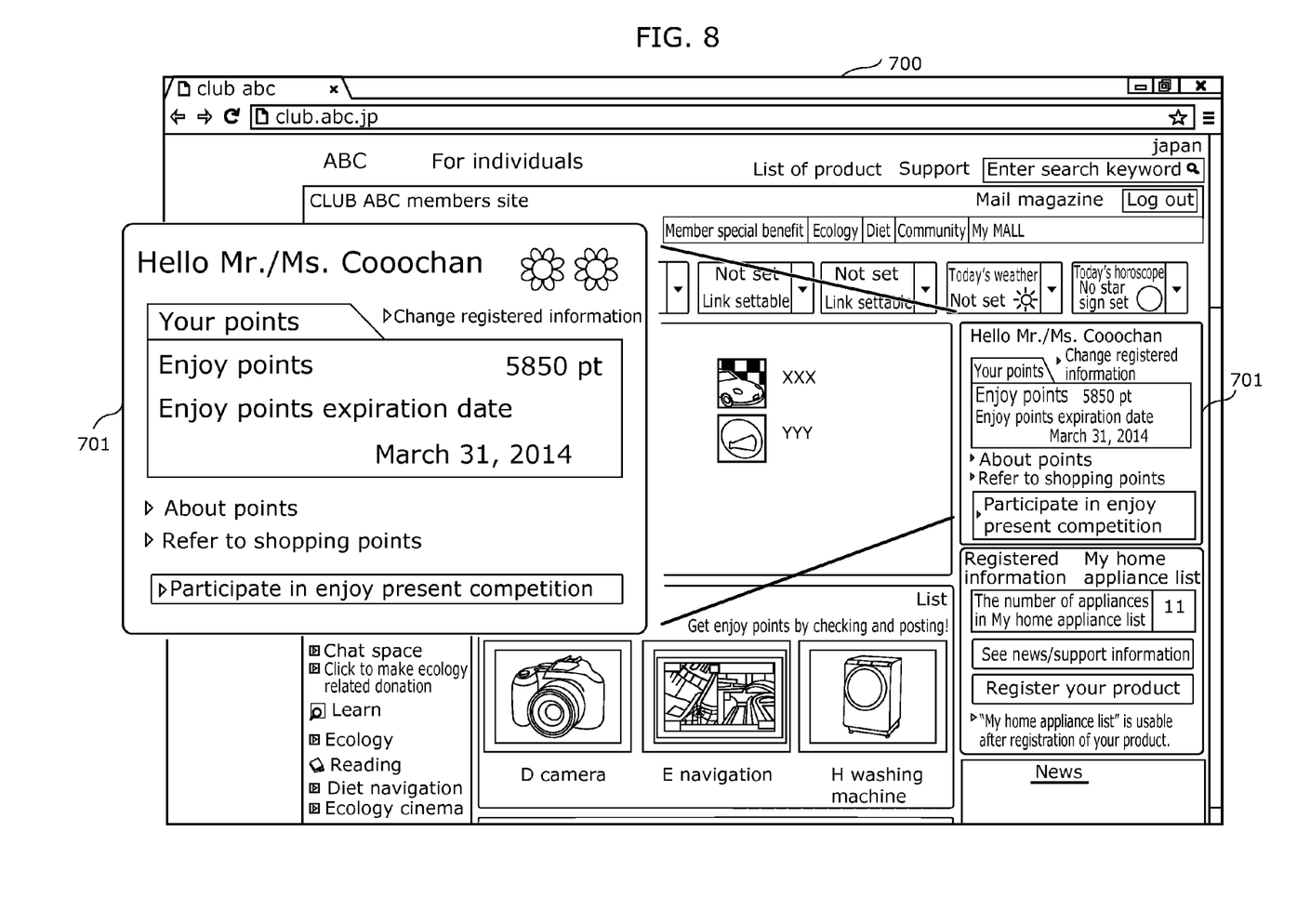
FIG. 8 illustrates another example of the privilege information according to the embodiment.

FIG. 7A, FIG. 7B, and FIG. 8 illustrate examples of privilege information according to the present embodiment.

For example, the privilege granting unit 206 may extend the warranty period of the appliance 10 of the user indicated by the user information to which the number of points greater than or equal to predetermined points have been added by the user ranking unit 205.

The extended warranty period can be granted as a privilege because if the appliance 10 is being fully used and the maintenance function such as cleaning is regularly used, the appliance 10 has a substantially longer life. This can give the user incentive to make full use of the appliance 10.

In this case, as information which facilitates the user to make full use of the appliance 10, as illustrated in FIG. 7A and FIG. 7B, a notice of extension of the warranty period of the appliance 10 may be provided to the user by the notice providing unit 204. Of course, the notice as illustrated in FIG. 7A or FIG. 7B may be provided by sending a separate written paper or the like. FIG. 7A and FIG. 7B each illustrate an example in which the user, indicated by the user information to which the number of points greater than or equal to the predetermined points are added, is differentiated from the other users by giving the user a title of Master.

The privilege granting unit 206 may further permit the user of the user information, to which the number of points greater than or equal to the predetermined points have been added, to perform a certain act in a predetermined community.

For example, as FIG. 8 illustrates, in a community site 700 operated by the manufacturer of the appliance 10, the user is permitted to make posts or participation in a prize competition. FIG. 8 illustrates an example where the user, indicated by the user information to which the number of points greater than or equal to the predetermined points have been added, is differentiated from the other users by showing a rank with the number of flowers on a screen 701.

The rank may be indicated in splendor of ornamentation of the flowers, or may be indicated in text of the title of the Mater as in the example in FIG. 7A.

This can give the user incentive to make full use of the appliance 10, such as making the user want to upgrade the rank in the community site 700.

Services such as granting a privilege according to the level of full use of the appliance 10 may be provided in manners other than the above. In the community site 700, a service may be provided to allow users belonging to the same attribute to share best practice information about the appliance 10. In such a case, the user can obtain information about the appliance 10 not owned by the user or use of the functions of the appliance 10 not currently used by the user, from the best practice information. In this way, incentive to make full use of the appliance 10 may be given to the user.

As described above, the server device 20 according to the present embodiment identifies the first functions as information which facilitates full use of an appliance, and provides the user with a notice which prompts use of the identified first functions. Accordingly, information which facilitates full use of the appliance can be provided.

Accordingly, as described above, a user management method and a server device can be obtained which are capable of providing the user with information which facilitates full use of the appliance including a plurality of functions.

A description has been given of the server device 20 according to the present embodiment including the communication unit 201, the appliance information storage unit 202, the use analysis unit 203, the notice providing unit 204, the user ranking unit 205, and the privilege granting unit 206. The present invention, however, is not limited to the above example. As a minimum configuration 20a of the server device 20, the appliance information storage unit 202, the use analysis unit 203, and the notice providing unit 204 may be included.

Next, a description will be given of an operation of the server device 20 configured as above.

Figure 9:
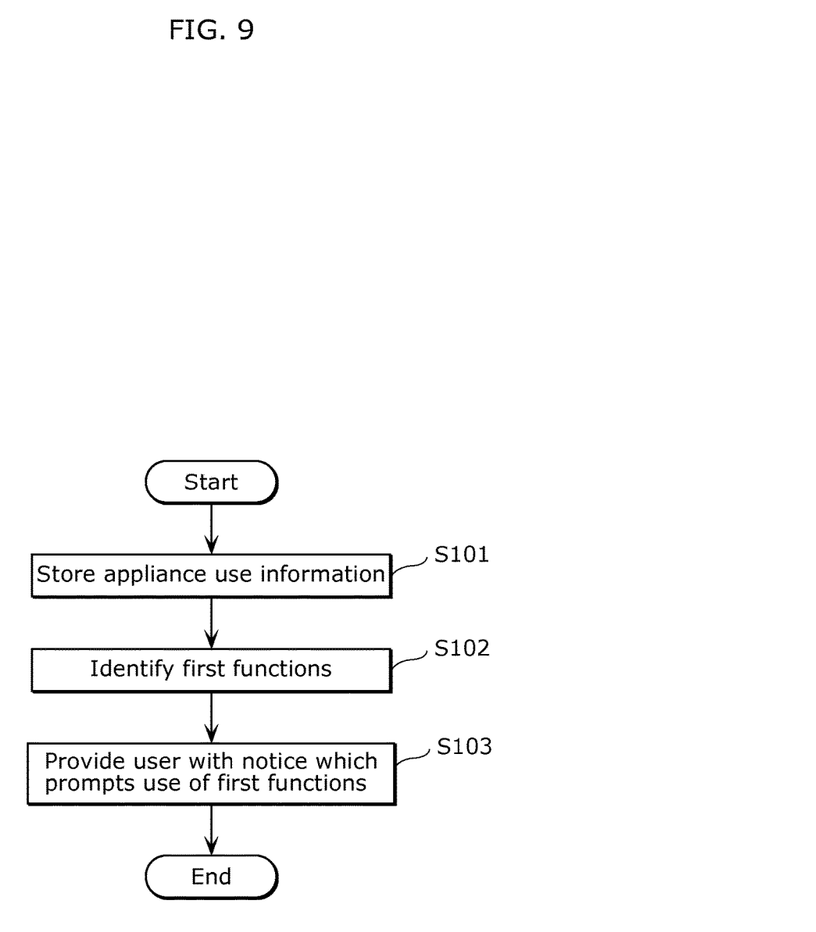
FIG. 9 is a flowchart illustrating an operation of the server device according to the embodiment.

FIG. 9 is a flowchart illustrating an operation of the server device according to the present embodiment. FIG. 9 is a flowchart of the operation performed by the minimum configuration 20a.

First, the server device 20 (minimum configuration 20a) stores appliance use information including appliance identification information for identifying the appliance 10, user information for identifying the user of the appliance 10, and the operating state of the appliance 10 when the appliance 10 was used (S101).

Next, the server device 20 (the minimum configuration 20a) analyzes the appliance use information stored in S101 to identify one or more first functions each having a use frequency less than or equal to a threshold value from among a plurality of functions of the appliance 10 (S102).

Next, the server device 20 (the minimum configuration 20a) provides the user with a notice which prompts use of the first functions identified in S102 (S103).

With this, according to one aspect of the present invention, a user management method, a server device, and a user management system can be obtained which are capable of providing information which facilitates the user to make full use of the appliance including a plurality of functions.

For example, the level of full use of the appliance 10 or a group of appliances 10 is quantified, and a predetermined service is provided to the user having a higher level of full use. In this way, incentive to make full use of the appliance 10 can be given to the user. Specifically, providing a service according to the level of full use of the appliance 10 can give the user incentive to make full use of the appliance 10.

The user management method, the server device, and the user management system according to one or more aspects of the present invention have been described above based on the embodiment. However, the present invention should not be limited to the embodiment. Various modifications to the embodiment that may be conceived by those skilled in the art and combinations of structural elements in different embodiments may be included within the scope of one or more aspects of the present invention, without departing from the spirit of the present invention.

For example, the following cases are also included within the scope of one or more aspects of the present invention.

(1) Specifically, each of the appliances and the server device described above is a computer system including a micro processor, a Read Only Memory (ROM), a Random Access Memory (RAM), a hard-disk unit, a display unit, a keyboard, and a mouse. The RAM or the hard-disk unit stores a computer program. The microprocessor operates on the computer program, which causes each of the devices to implement a function thereof. Here, the computer program includes a combination of plural instruction codes sending an instruction to the computer in order to achieve a predetermined function. The devices are not limited to a computer system that includes all of the following components: microprocessor, ROM, RAM, hard disk unit, display unit, keyboard, mouse, and the like; the devices may also be a computer system including only some of these components.

(2) Some or all of the structural elements included in each of the above devices may be included in a single system LSI (Large Scale Integration). A system LSI is an ultra-multifunction LSI manufactured with plural structural units integrated on a single chip. Specifically, the system LSI is a computer system including a micro processor, a ROM, a RAM and the like. The RAM stores a computer program. The microprocessor operates on the computer program, which causes the system LSI to implement the function thereof.

Although referred to as a system LSI here, depending on the degree of integration, the terms IC, LSI, super LSI, or ultra LSI are also used. In addition, the method for assembling integrated circuits is not limited to LSI, and a dedicated circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Moreover, if technology for forming integrated circuits that replaces LSIs emerges, owing to advances in semiconductor technology or to another derivative technology, the integration of functional blocks may naturally be accomplished using such technology. The application of biotechnology or the like is possible.

(3) Part or all of the structural elements included in each of the above devices may be configured as an IC card detachable from each device, or as a single module. The IC card or the module is a computer system that includes a microprocessor, a ROM, a RAM, and the like. The IC card or the module may include therein the above-mentioned ultra-multifunctional LSI. The microprocessor operates on a computer program, which causes the IC card or the module to accomplish its function. The IC card or the module may be tamper resistant.

(4) The present invention may be implemented as a method including the operations of characteristic units included in the above user management system as steps. The present invention may also be a computer program executing the method by a computer, and a digital signal including the computer program.

The present invention may also be a computer-readable recording medium, such as a flexible disk, hard disk, CD-ROM, MO, DVD, DVD-ROM, DVD-RAM, Blu-ray (registered trademark) Disc (BD), or semiconductor memory, on which the above-mentioned computer program or digital signal is recorded. The present invention may also be the computer programs or digital signal recorded on such a recording medium.

The present invention may also be the computer programs or digital signal to be transmitted via networks, of which telecommunications networks, wire/wireless communications networks, and the Internet are representative, or via data broadcasting.

Moreover, the present invention may be implemented as a computer system including a microprocessor and a memory, in which the memory stores the computer program and the microprocessor operations on the computer program.

Moreover, the present invention may be implemented by another independent computer system by transferring the program or the digital signal recorded onto the recording medium, or by transferring the program or the digital signal via the network or the like.

(5) The above embodiment and the variations may be combined with one another.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The present invention is applicable to a method, a device, a server, and a system which provide information which facilitates a user to make full use of an appliance including a plurality of functions.

REFERENCE SIGNS LIST 10, 10A, 10B, 10C Appliance
20 Server device
20a Minimum configuration
30 Network
101, 201 Communication unit
102 Storage unit
103 Control unit
104 Input unit
202 Appliance information storage unit
203 Use analysis unit
204 Notice providing unit
205 User ranking unit
206 Privilege granting unit
700 Community site
701 Screen

The invention claimed is:

1. A user management method comprising:
   storing, in a storage device, appliance use information including: (i) appliance identification information for identifying each of one or more appliances, (ii) user information for identifying a user of each of the one or more appliances, and (iii) an operating state of each of the one or more appliances when each of the one or more appliances was used;
   analyzing, by a server device, the appliance use information stored in the storing to
      (i) determine, for each of all of the functions of the one or more appliances, a use frequency indicating a number of times or a length of a period the function was used in a predetermined period,
      (ii) identify, from among all of the functions of the one or more appliances, one or more first functions having the use frequency less than or equal to a threshold value, and
      (iii) calculate, as a level of full use of each of the one or more appliances, a value of a proportion obtained by dividing (a) a number obtained by subtracting a total number of the identified one or more first functions from the total number of all of the functions by (b) a total number of all of the functions of the one or more appliances;
   providing, by the server device, a terminal of the user with a notice for prompting the user to use the identified one or more first functions if one of the identified first functions identified in the identifying concerns performing maintenance of each of the one or more appliances; and adding, by the server device, one or more points to the user information based on the calculated level of the full use, the one or more points added to the user information being an incentive prompting the user to use the one or more first functions.

2. The user management method according to claim 1, wherein in the analyzing, one or more second functions are identified from among the plurality of functions of each of the one or more appliances based on the appliance use information, and a use frequency of each of the one or more second functions identified is calculated based on the appliance use information, the one or more second functions each achieving the operating state of each of the one or more appliances indicated by the appliance use information, and the one or more first functions identified include (i) a function having a use frequency less than or equal to a threshold value among the one or more second functions of each of the one or more appliances used by the user, and (ii) a function not used by the user among the plurality of functions excluding the one or more second functions.

3. The user management method according to claim 1, wherein the threshold value is zero, and the one or more first functions have never been used by the user among the plurality of functions of each of the one or more appliances.

4. The user management method according to claim 1, wherein in the adding, a total number of the one or more points added to the user information of the user of each of the one or more appliances increases with a decrease in a total number of the one or more first functions among the plurality of functions of each of the one or more appliances.

5. The user management method according to claim 4, further comprising extending, by the server device, a warranty period of each of the one or more appliances of the user indicated by the user information to which the total number of the one or more points greater than or equal to a predetermined point has been added.

6. The user management method according to claim 4, further comprising permitting, by the server device, the user indicated by the user information, to which the total number of the one or more points greater than or equal to a predetermined point has been added, to perform an act in a predetermined community.

7. The user management method according to claim 1, wherein the one or more appliances are two or more appliances, in the analyzing, a level of full user among the two or more appliances used during a same time period is further calculated, and in the adding, the one or more points are added to the user information based on the calculated level of the full use of each of the one or more appliances, and the calculated level of the full use among the two or more appliances.

8. The user management method according to claim 1, further comprising communicating, by the server device, with each of the one or more appliances to receive the appliance use information of each of the one or more appliances, wherein the appliance identification information is for identifying a type of each of the one or more appliances, and in the analyzing, the appliance use information of each of the one or more appliances is analyzed to identify a function from among a plurality of functions of each type of each of the one or more appliances as the one or more first functions, the function having a use frequency less than or equal to a threshold value determined for each of the one or more appliances.

9. The user management method according to claim 8, wherein in the adding, among user information items of users each of whom is a user of two or more types of the appliances, one or more points are added to a user information item of a user of the two or more types of the appliances, a total number of the one or more points increasing with a decrease in a total number of the one or more first functions identified from among a plurality of functions of each of the two or more types of the appliances.

10. A server device comprising control circuitry and a storage device, the control circuitry operative to:

store, in the storage device, appliance use information including: (i) appliance identification information for identifying each of one or more appliances, (ii) user information for identifying a user of each of the one or more appliances, and (iii) an operating state of each of the one or more appliances when each of the one or more appliances was used;

analyze the appliance use information stored in the storage device to
(i) determine, for each of all of the functions of the one or more appliances, a use frequency indicating a number of times or a length of a period the function was used in a predetermined period,
(ii) identify, from among all of the functions of the one or more appliances, one or more first functions having the use frequency less than or equal to a threshold value, and
(iii) calculate, as a level of full use of each of the one or more appliances, a value of a proportion obtained by dividing (a) a number obtained by subtracting a total number of the identified one or more first functions from the total number of all of the functions by (b) a total number of all of the functions of the one or more appliances;

provide the user with a notice for prompting the user to use the identified one or more first functions if one of the identified first functions identified using the appliance use information stored in the storage device concerns performing maintenance of each of the one or more appliances; and add one or more points to the user information based on the calculated level of the full use, the one or more points added to the user information being an incentive prompting the user to use the one or more first functions.

11. A server device comprising control circuitry and a storage device, the control circuitry operative to:

store, in the storage device, appliance use information including: (i) appliance identification information for identifying each of two or more appliances, (ii) user information for identifying a user of each of the two or more appliances, and (iii) an operating state of each of the two or more appliances when each of the two or more appliances were used;

analyze the appliance use information stored in the storage device to
- (i) determine, for each of all of the functions of the two or more appliances, a use frequency indicating a number of times or a length of a period the function was used in a predetermined period,
- (ii) identify, from among all of the functions of the two or more appliances, one or more first functions having the use frequency less than or equal to a threshold value, and
- (iii) calculate, as a level of full use of each of the two or more appliances, a value of a proportion obtained by dividing (a) a number obtained by subtracting a total number of the identified one or more first functions from the total number of all of the functions by (b) a total number of all of the functions of the two or more appliances;

provide the user with a notice for prompting the user to use the identified one or more first functions if one of the identified first functions identified using the appliance use information stored in the storage device concerns performing maintenance of each of the two or more appliances; and add one or more points to the user information based on the calculated level of the full use, the one or more points added to the user information being an incentive prompting the user to use the one or more first functions.

12. The user management method according to claim 1, wherein full use of each of the one or more appliances occurs when the use frequency of each of the plurality of functions of each of the one or more appliances is greater than the threshold value.

* * * * *